(12) United States Patent
Chang

(10) Patent No.: US 9,857,527 B2
(45) Date of Patent: Jan. 2, 2018

(54) LIGHT GUIDING DEVICE, DISPLAY DEVICE WITH SAME AND METHOD FOR MANUFACTURING SAME

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 117 days.

(21) Appl. No.: 14/945,913

(22) Filed: Nov. 19, 2015

(65) Prior Publication Data

US 2016/0327731 A1 Nov. 10, 2016

(30) Foreign Application Priority Data

May 4, 2015 (CN) .......................... 2015 1 0219949

(51) Int. Cl.
G02B 5/00 (2006.01)
G02B 27/00 (2006.01)
G02B 7/00 (2006.01)
F21V 8/00 (2006.01)
G02B 5/04 (2006.01)

(52) U.S. Cl.
CPC ........... *G02B 6/0078* (2013.01); *G02B 5/045* (2013.01); *G02B 6/0065* (2013.01)

(58) Field of Classification Search
CPC ..... G02B 5/005; G02B 27/022; C08F 257/02; C08F 220/18; G02F 2001/133331
USPC .................................................. 359/894, 895
See application file for complete search history.

(56) References Cited

U.S. PATENT DOCUMENTS

2012/0294037 A1* 11/2012 Holman .................... F21V 5/02
362/609

* cited by examiner

*Primary Examiner* — Bumsuk Won
*Assistant Examiner* — Tamara Y Washington
(74) *Attorney, Agent, or Firm* — ScienBiziP, P.C.

(57) ABSTRACT

A light guiding device can include a light entering face, a light exiting face and an extension face. The light exiting face intersects the light entering face at a first intersecting line. The extension face connects the light entering face and the light exiting face. The extension face and the light entering face collectively define an included angle facing the light exiting face, and the included angle is an obtuse angle. A display device with the light guiding device and a method for manufacturing the light guiding device are also provided.

19 Claims, 9 Drawing Sheets

LIGHT GUIDING DEVICE, DISPLAY DEVICE WITH SAME AND METHOD FOR MANUFACTURING SAME

FIELD

The subject matter herein generally relates to display technology, and particularly to a light guiding device, a display device with the light guiding device, and a method for manufacturing the light guiding device.

BACKGROUND

With the development of display technology, large screen display as one kind of flat panel displays has a certain consumer market. Generally, the larger screen display is realized by combining two or more display screens together.

BRIEF DESCRIPTION OF THE DRAWINGS

Implementations of the present technology will now be described, by way of example only, with reference to the attached figures.

DETAILED DESCRIPTION

Figure 1:
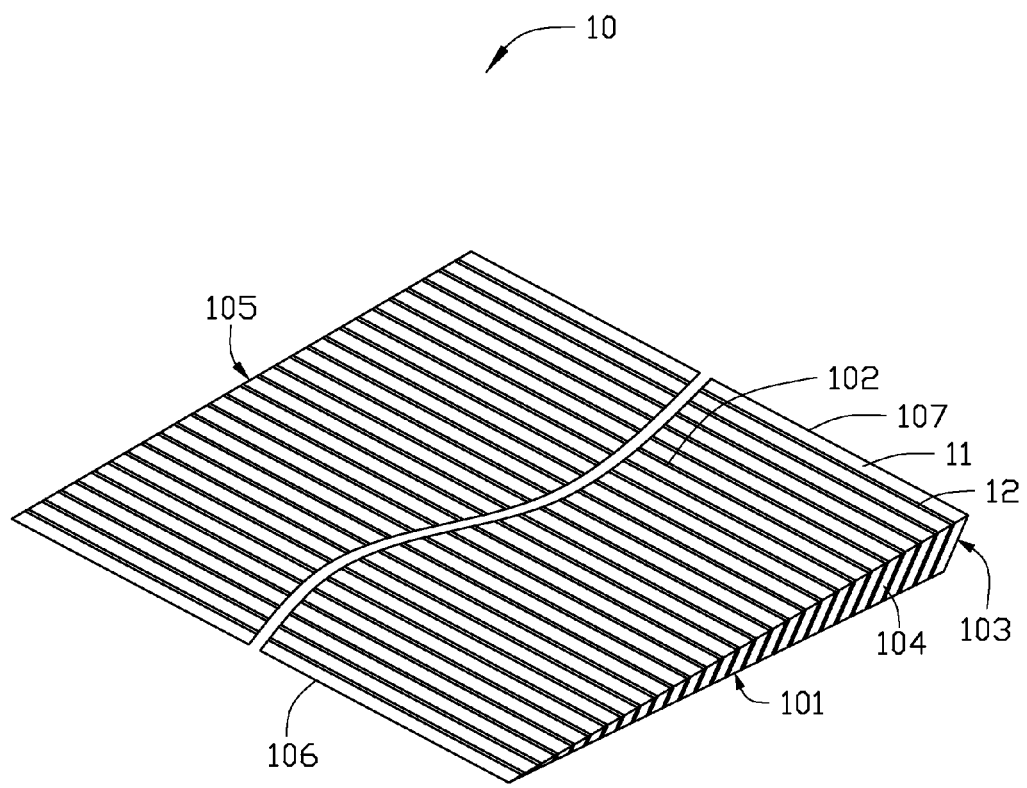
FIG. 1 is an isometric view of a light guiding device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a light guiding device. The light guiding device can include a light entering face, a light exiting face and an extension face. The light exiting face intersects the light entering face at a first intersecting line. The extension face connects the light entering face and the light exiting face. The extension face and the light entering face collectively define an included angle facing the light exiting face, and the included angle is an obtuse angle.

The present disclosure is described further in relation to a display device. The display device can include two screens arranged side by side, frame located between the two screens and two light guiding devices. Each of the screens can include a light outputting face. The two light guiding devices are coupled to the two screens and arranged side by side. Each of the light guiding devices can include a light entering face, a light exiting face and an extension face. The light exiting face intersects the light entering face. The extension face connects the light entering face and the light exiting face. The light entering faces of the two light guiding devices are coupled to the light outputting faces of the two screens respectively, the light exiting faces of the two light guiding devices are coupled to each other, the extension faces of the two light guiding devices collectively define a shielding space between the light exiting faces and the light outputting faces, and the frame is received in the shielding space.

The present disclosure is described further in relation to a method for manufacturing a light guiding device. The method can include the following components. A plurality of glass substrates and a plurality of transparent adhesive layers are provided. The plurality of glass substrates and the plurality of transparent adhesive layers are alternately stacked to be a stacked structure. The stacked structure can include a top face, a bottom face opposite to the top face, a side face and an additional side face parallel to and opposite to the side face. The stacked structure can defines a first precutting plane, a second precutting plane and a third precutting plane. The first precutting plane extends from an intersecting line of the side face and the top face to an intersecting line of the additional side face and the bottom face. The second precutting plane intersects the first precutting plane and the additional side face. The third precutting plane intersects the first precutting plane and the side face. The second precutting plane is parallel to the third precutting plane. The stacked structure is cut along the first precutting plane, the second precutting plane and the third precutting plane.

Figure 2:
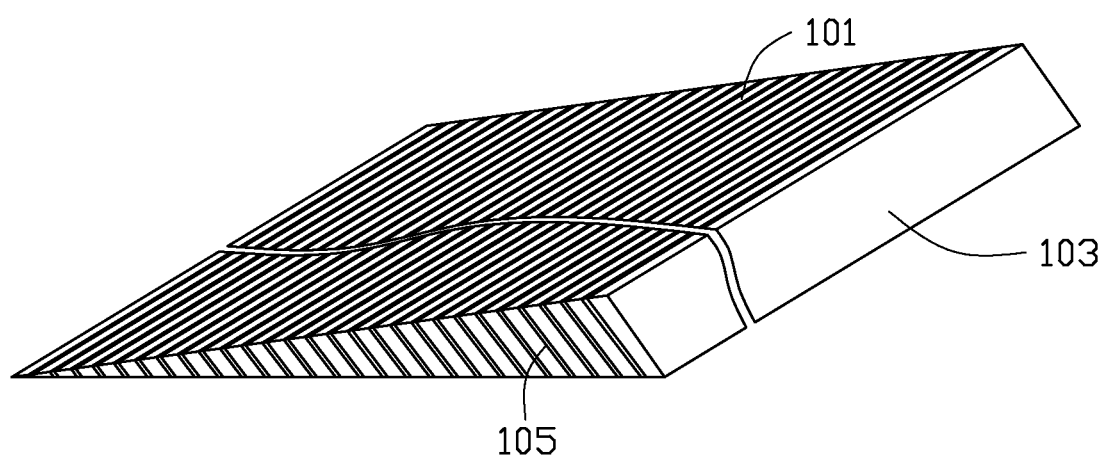
FIG. 2 is an isometric view of the light guiding device in FIG. 1, but viewed from a different aspect.

FIG. 1 and FIG. 2 illustrate a light guiding device 10 of an embodiment of the present disclosure. The light guiding device 10 can include a light entering face 101, a light exiting face 102, an extension face 103, a first coupling face 104 and a second coupling face 105.

The light entering face 101, the light exiting face 102 and the extension face 103 are coupled to each other and collectively form a structure of triangular prism. The light exiting face 102 has a whole area larger than that of the light entering face 101. The extension face 103 connects the light entering face 101 and the light exiting face 102. The extension face 103 and the light entering face 101 collectively define an included angle facing the light exiting face 102. The included angle between the extension face 103 and the light entering face 101 is an obtuse angle.

In at least one embodiment, the light entering face 101, the light exiting face 102 and the extension face 103 each are located between and perpendicular to the first coupling face 104 and the second coupling face 105.

The light entering face 101 and the light exiting face 102 are intersected at a first intersecting line 106. The light exiting face 102 and the extension face 103 are intersected at a second intersecting ling 107. In the illustrated embodiment, the first intersecting line 106 is parallel to the second intersecting line 107. In at least one alternative embodiment, the first intersecting line 106 is not parallel to the second intersecting line 107. Here, at least one of the light entering face 101, the light exiting face 103 and the extension face 103 is not perpendicular to the first coupling face 104 and the second coupling face 105.

The first coupling face 104 is substantially parallel and opposite to the second coupling face 105.

In at least one embodiment, each of the light entering face 101, the light exiting face 102, the extension face 103, the first coupling face 104 and the second coupling face 105 is a flat face.

The light guiding device 10 can be an integral structure or a stacked structure with multi-layers. In the illustrated embodiment, the light guiding device 10 is a stacked structure with multi-layers.

The light guiding device 10 can include a plurality of glass substrates 11 and a plurality of transparent adhesive layers 12 stacked together. In the illustrated embodiment, the light guiding device 10 can include two hundreds glass substrates 11 and one hundred and ninety-nine transparent adhesive layers 12.

Each of the glass substrates 11 has a thickness less than 200 micrometers. In at least one embodiment, the thickness of each of the glass substrates 11 is about 100 micrometers.

The transparent adhesive layer 12 has a refractive index no more than that of the glass substrate 11.

The glass substrates 11 and the transparent adhesive layers 12 are alternately arranged along a stacked direction from the extension face 103 to the first intersecting line 106. The light guiding device 10 has two glass substrates 11 respectively located at two outer sides thereof, along the stacked direction.

Each of the light entering face 101, the light exiting face 102, the first coupling face 104 and the second coupling face 105 is defined by the plurality of glass substrates and the plurality of transparent adhesive layer.

The extension face 103 is an outer face of one glass substrate 11 located at one of the two outer sides of the light guiding device 10.

Figure 3:
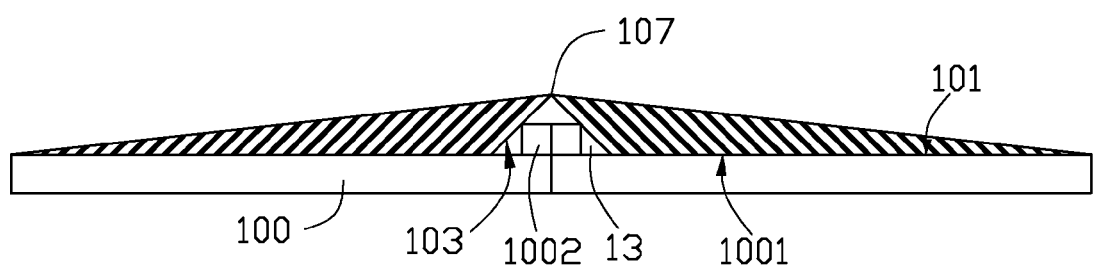
FIG. 3 is a diagrammatic view of a display device applying the light guiding device in FIG. 1.

FIG. 3 illustrates a display device 1 of an embodiment of the present disclosure. The display device 1 can include a plurality of screens 100, a plurality of light guiding devices 10 coupled to the plurality of screens 100, and one or a plurality of frames 1002 each located between every two adjacent screens 100. In at least one embodiment, the display device 1 includes even numbers of light guiding devices 10. In the illustrated embodiment, the number of the light guiding devices 10 is two. The number of the screens 100 is two. The number of the frames 1002 is two.

The two screens 100 are arranged side by side. The two screens 100 include two light outputting faces 1001 facing the two light guiding devices 10. The two light outputting faces 1001 of the two screens 100 are substantially coplanar. The two frames 1002 are coupled to each other and located between the two screens 100. The two frames 1002 are intersected with each other.

The two light guiding devices 10 are arranged side by side. The two light entering faces 101 of the two light guiding devices 10 are coupled to the light outputting faces 1001 of the two screens 100. The light exiting faces 102 of the two light guiding devices 10 are coupled to each other. In at least one embodiment, the light exiting faces 102 are in direct contact with each other. The two extension faces 103 of the two light guiding devices 10 face each other. The two second intersection lines 107 of the two light guiding devices 10 are coupled to and overlapped with each other. The two extension faces 103 are coupled to each other and are collectively define a shielding space 13 between the two light guiding devices 10. The shielding space 13 is located between the light outputting faces 1001 of the screens 100 and the light exiting faces 102. The two frames 1002 are located in the shielding space 13 between the two light guiding devices 10, which can realize display without borders.

Orthographic projections of the two light exiting faces 102 on a plane where the light outputting faces 1001 of the two screens 100 are located entirely cover the two screens 100 and the two frames 1002. Orthographic projections of the two extension faces 103 on the plane where the light outputting faces 1001 of the two screens 100 are located cover the two frames 1002 between the two screens 100. An orthographic projection of the second intersecting line 107 on the plane where the light outputting faces 1001 of the two screens 100 are located is overlapped an intersecting line of the two frames 1002.

When in use, lights from the screens 100 enter into the light guiding devices 10 via the light entering faces 101, are guided to the whole light exiting faces 102, and are refracted out of the light guiding devices 100 via the light exiting faces 102, which realizes seamless connection of the pictures displayed by the two screens 100, no dark area is existed when users watch the pictures displayed by the screens 100 via the light guiding devices 10.

Figure 4:
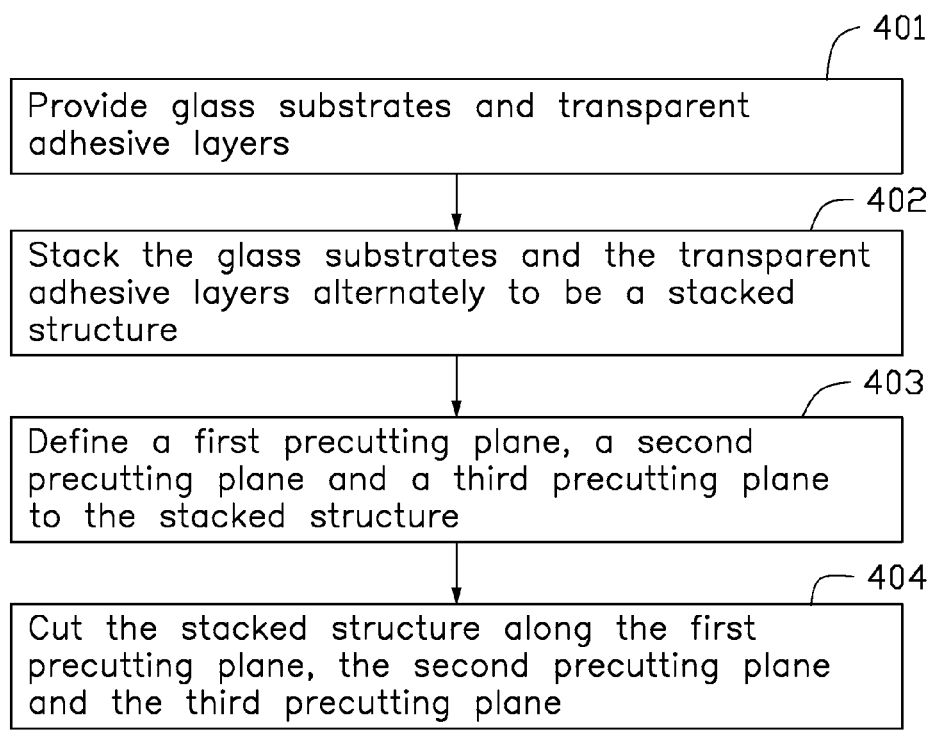
FIG. 4 is a flowchart for manufacturing a light guiding device in accordance with an embodiment of the present disclosure.

FIG. 4 illustrates a flowchart of an example method for manufacturing the light guiding device 10. The example method is provided by way of example, as there are a variety of ways to carry out the method. The example method described below can be carried out using the configurations illustrated in FIGS. 1, 2 and 5, for example, and various elements of these figures are referenced in explaining the example method. Each block shown in FIG. 4 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 401.

Figure 5:
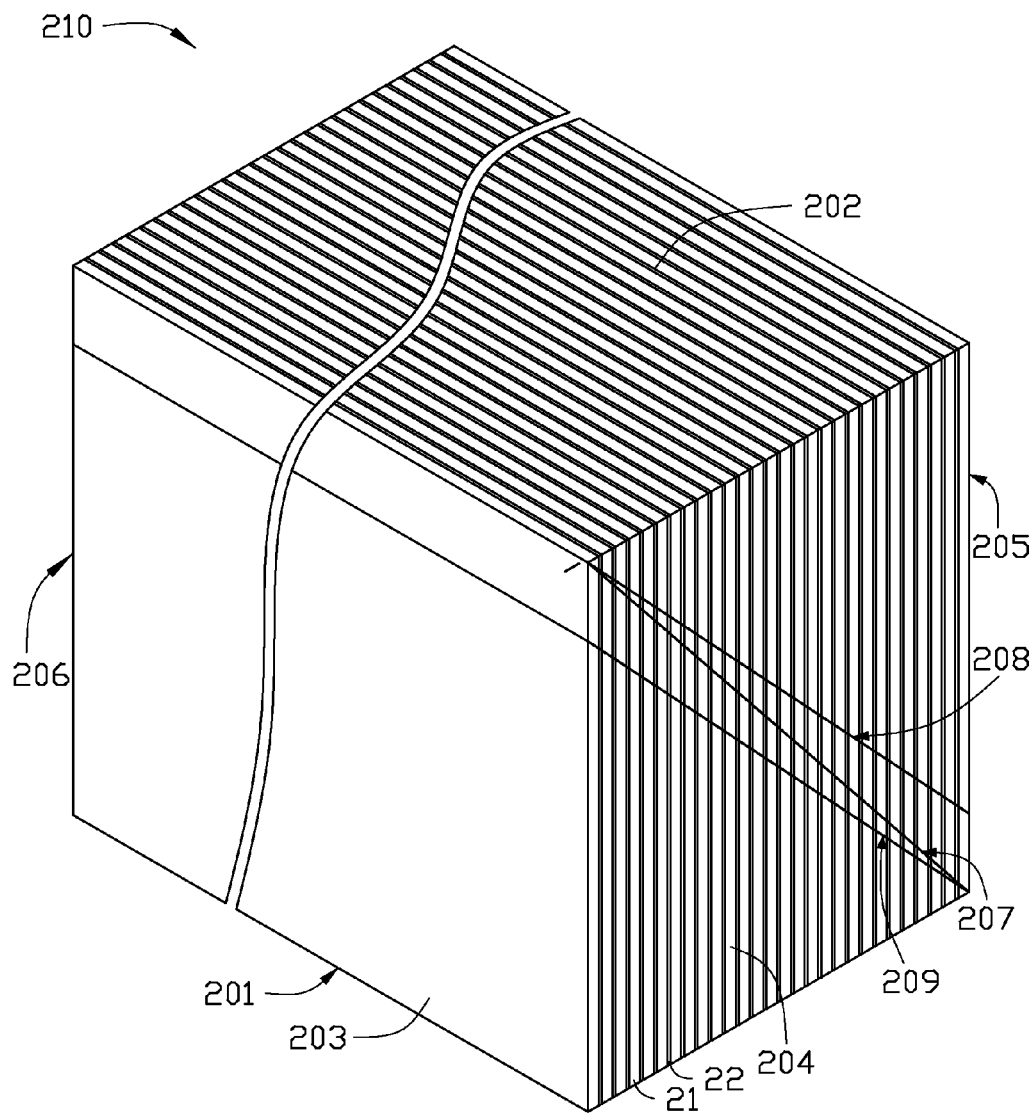
FIG. 5 is an isometric view of a stacked structure of glass substrates and transparent adhesive layers.

At block 401, also referring to FIG. 5, a plurality of glass substrates 21 and a plurality of transparent adhesive layers 22 are provided.

In at least one embodiment, the light guiding device 10 can include two hundreds glass substrates 21 and one hundred and ninety-nine transparent adhesive layers 22.

The glass substrates 21 are same to each other in shape, size and configuration. Each of glass substrates 21 can be a thin plate. Each of the glass substrates 21 can be rectangular. Each of the glass substrates 21 has a thickness less than 200 micrometers. In at least one embodiment, the thickness of each of the glass substrates 21 is about 100 micrometers.

Each of the transparent adhesive layers 22 is same to each of the glass substrates 21 in shape and size. The transparent adhesive layer 22 has a refractive index no more than that of the glass substrate 21. Each of the transparent adhesive layers 22 has a thickness less than that of each of the glass substrates 21.

At block 402, also referring to FIG. 5, the glass substrates 21 and the transparent adhesive layers 22 are alternately stacked together to get a stacked structure 210. The stacked structure 210 has two glass substrates 21 respectively located at two outer sides thereof, along a stacked direction of the glass substrates 21 and the transparent adhesive layers 22.

In at least one embodiment, the stacked structure 210 has ends of the glass substrates 21 flushed to each other. Every two adjacent glass substrates 21 are entirely overlapped to each other along the stacked direction. Every two adjacent glass substrate 21 and the transparent adhesive layer 22 are entirely overlapped to each other along the stacked direction.

The stacked structure 210 can include a bottom face 201, a top face 202, a first side face 203, a second side face 204, a third side face 205 and a fourth side face 206. The bottom face 201 is parallel and opposite to the top face 202. The first side face 203 is parallel and opposite to the third side face 205. The second side face 204 is parallel and opposite to the fourth side face 206. The first side face 203, the second side face 204, the third side face 205 and the fourth side face 206 are connected one by one. The first side face 203 and the third side face 205 are perpendicular to the second side face 204 and the fourth side face 206. The first side face 203, the second side face 204, the third side face 205 and the fourth side face 206 each are perpendicular to and located between the bottom face 201 and the top face 202. In the illustrated embodiment, the stacked structure 210 is a cuboid.

At block 403, the stacked structure 210 further defines a first precutting plane 207, a second precutting plane 208 and a third precutting plane 209. The first precutting plane 207, a second precutting plane 208 and the third precutting plane 209 are not overlapped to each other.

The first precutting plane 207 is a diagonal plane of the stacked structure 210. In the illustrated embodiment, the first precutting plane 207 extends from an intersecting line of the first side face 203 and the top face 202 to an intersecting line of the third side face 205 and the bottom face 201.

The second precutting plane 208 is intersected with the first precutting plane 207 and the third side face 205. In the illustrated embodiment, the second precutting plane 208 and the first precutting plane 207 are intersected at the intersecting line of the top face 202 and the first side face 203. An intersecting line of the second precutting plane 208 and the third side face 205 is parallel to the bottom face 201. The second precutting plane 208 and the third side face 205 collectively define an included angle facing the first precutting plane 207. The included angel between the second precutting plane 208 and the third side face 205 is an obtuse angle.

The third precutting plane 209 is intersected with the first precutting plane 207 and the first side face 203. The third precutting plane 209 is parallel to the second precutting plane 208. The third precutting plane 209 and the first precutting plane 207 are intersected at the intersecting line of the third side face 205 and the bottom face 201. An intersecting line of the third precutting plane 209 and the first side face 203 is parallel to the top face 202.

At block 404, also referring to FIG. 1 and FIG. 5, the stacked structure 210 is cut along the first precutting plane 207, the second precutting plane 208 and the third precutting plane 209, to get two light guiding devices 10. The two light guiding devices 10 obtain two light exiting faces 102 by cutting the stacked structure 210 along the first precutting plane 207.

The two light guiding devices 10 obtain two light entering faces 101 by cutting the stacked structure 210 along the second precutting plane 208 and the third precutting plane 209.

In at least one embodiment, the stacked structure 210 is cut by laser cutting, diamond wire saw or water knife cutting or other ways.

The method can further include grinding and polishing the light entering faces 101 and the light exiting faces 102 of the light guiding devices 10, to make the light entering faces 101 and the light exiting faces 102 smooth.

Figure 6:
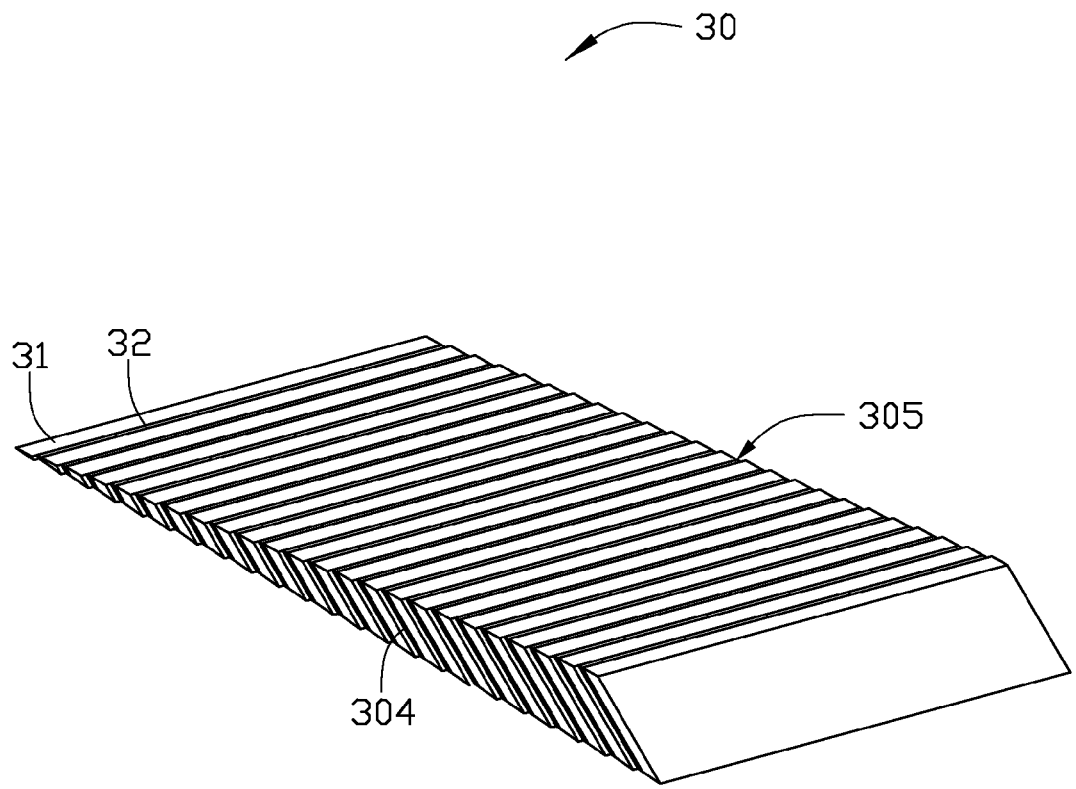
FIG. 6 is an isometric view of a light guiding device in accordance with an alternative embodiment of the present disclosure.
Figure 7:
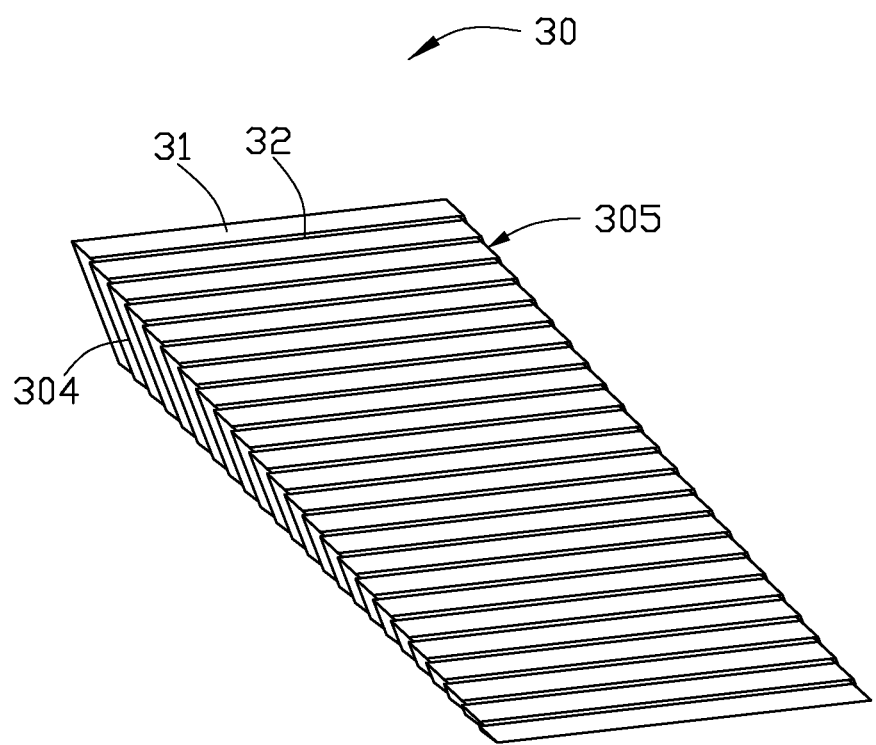
FIG. 7 is a similar view of the light guiding device in FIG. 6, but viewed from a different aspect.

FIG. 6 and FIG. 7 illustrate a light guiding device 30 of an alternative embodiment. The light guiding device 30 is similar to the light guiding device 10, a different therebetween is that the light guiding device 30 includes a first coupling face 304 and a second coupling face 305. Each of the first coupling face 304 and the second coupling face 305 is a rugged face.

The light guiding device 30 is a stacked structure. The light guiding device 30 can include a plurality of glass substrates 31 and a plurality of transparent adhesive layers 32 stacked together. The glass substrates 31 and the transparent adhesive layers 32 are alternately arranged along a stacked direction of the light guiding device 30. The light guiding device 30 has two glass substrates 31 respectively located at two outer sides thereof, along the stacked direction. The transparent adhesive layer 32 located in two adjacent glass substrates 31 has an area equal to an overlapping area of the two adjacent glass substrates 31, along the stacked direction of the light guiding device 30.

In the illustrated embodiment, if a distance between rims of every two adjacent glass substrates 31 along a direction perpendicular to the stacked direction is regarded as an item of a sequence, the sequence is a constant sequence with nonzero item number. In at least one alternative embodiment, the sequence can be an arithmetic sequence with nonzero tolerance, or a geometric sequence with a common ratio which is not equal to 0 or 1.

Figure 8:
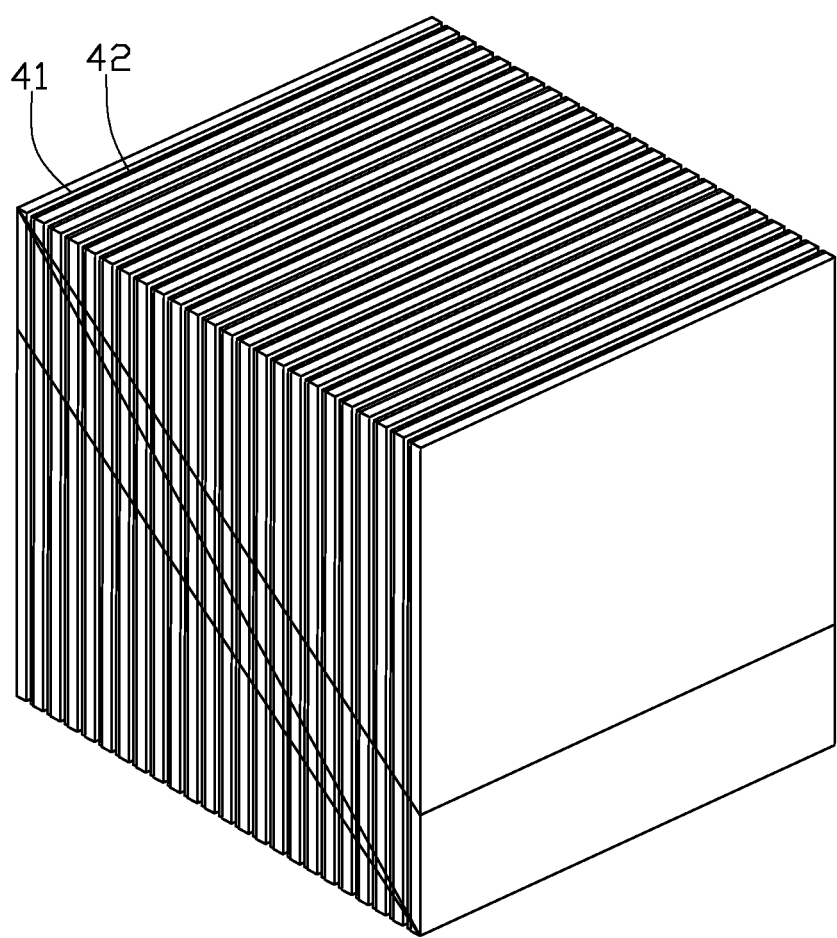
FIG. 8 is an isometric view of a stacked structure of glass substrates and transparent adhesive layers.
Figure 9:
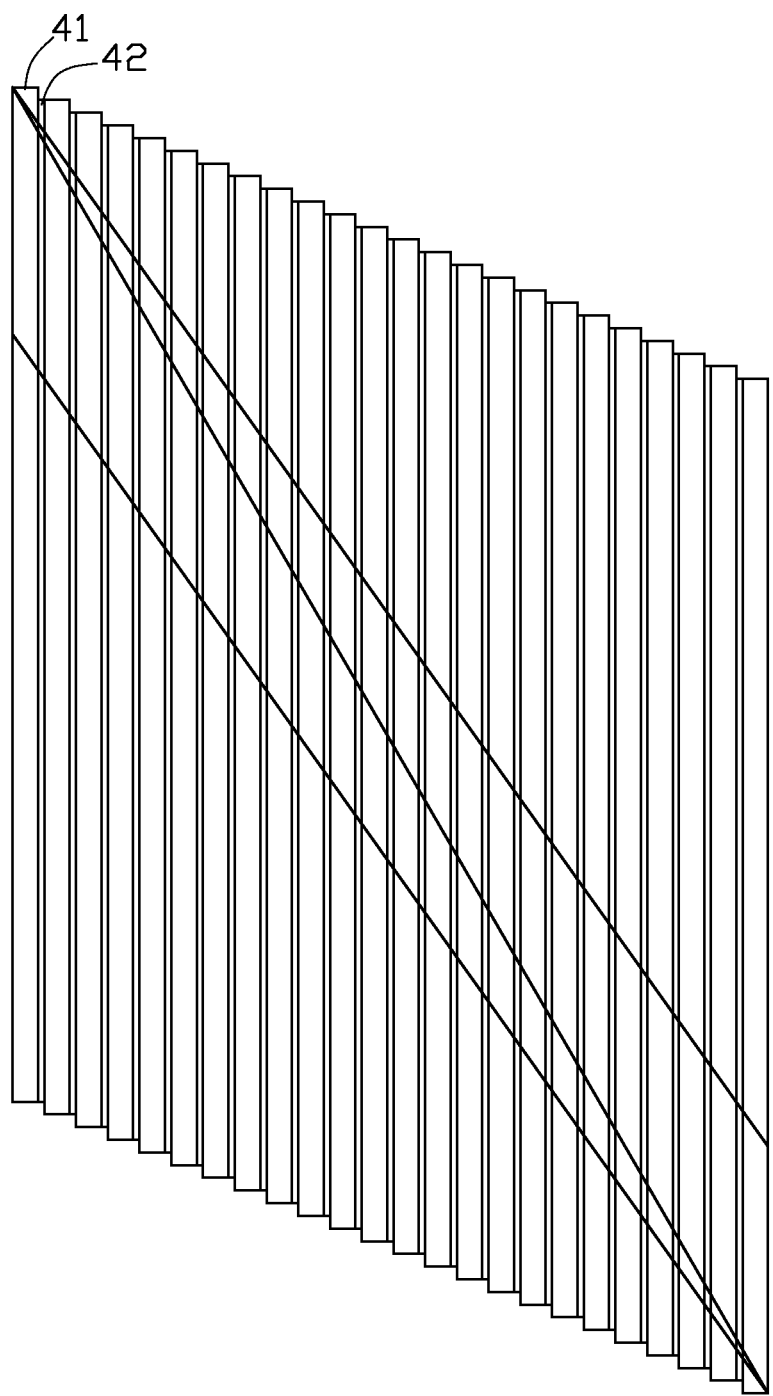
FIG. 9 is a plan view of the stacked structure in FIG. 8.

FIG. 8 and FIG. 9 illustrate a method for manufacturing the light guiding device 30. The method for manufacturing the light guiding device 30 is similar to the method for manufacturing the light guiding device 10, a difference therebetween is that, in the method for manufacturing the light guiding device 30, a plurality of glass substrates 41 and a plurality of transparent adhesive layers 42 are alternately stacked to have rims of every two adjacent glass substrates 41 are staggered to each other along a stacked direction of the glass substrates 41 and the transparent adhesive layers 42. In the illustrated embodiment, the glass substrates 41 have ends thereof staggered.

In the illustrated embodiment, if a distance between rims of every two adjacent glass substrates 41 along a direction perpendicular to the stacked direction is regarded as an item of a sequence, the sequence is a constant sequence with nonzero item number. The transparent adhesive layer 42 located in two adjacent glass substrates 41 has an area equal to an overlapping area of the two adjacent glass substrates 41, along the stacked direction. In at least one alternative embodiment, the sequence can be an arithmetic sequence with nonzero tolerance, or a geometric sequence with a common ratio which is not equal to 0 or 1.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A light guiding device comprising:
   a light entering face;
   a light exiting face intersecting the light entering face at a first intersecting line; and
   an extension face connecting the light entering face and the light exiting face;
   wherein the extension face and the light entering face collectively define an included angle that is an obtuse angle.

2. The light guiding device of claim 1, further comprising a plurality of glass substrates and a plurality of transparent adhesive layers alternately arranged to each other.

3. The light guiding device of claim 2, wherein the transparent adhesive layer has a refractive index no more than that of the glass substrate.

4. The light guiding device of claim 2, wherein each of the light entering face and the light exiting face is defined by the plurality of glass substrates and the plurality of transparent adhesive layers.

5. The light guiding device of claim 4, wherein the extension face is a face of one of the glass substrates.

6. The light guiding device of claim 5, further comprising a first coupling face and a second coupling face opposite dot the first coupling face, wherein each of the light entering face, the light exiting face and the extension face is located between and connecting the first coupling face and the second coupling face.

7. The light guiding device of claim 6, wherein each of the first coupling face and the second coupling face are defined by the glass substrates and the transparent adhesive layers.

8. The light guiding device of claim 7, wherein each of the first coupling face and the second coupling face is a flat face.

9. The light guiding device of claim 7, wherein each of the first coupling face and the second coupling face is a rugged face.

10. The light guiding device of claim 1, wherein the light entering face and the extension face are intersected at a second intersecting line, the second intersecting line paralleling to the first intersecting line.

11. A display device comprising:
    two screens arranged side by side, each of the two screens comprising a light outputting face;
    a frame located between the two screens; and
    two light guiding devices coupled to the two screens and arranged side by side, each of the two light guiding devices comprising:
      a light entering face;
      a light exiting face intersecting the light entering face; and
      an extension face connecting the light entering face and the light exiting face;
    wherein the light entering faces of the two light guiding devices are coupled to the light outputting faces of the two screens respectively, respective light exiting faces of the two light guiding devices are coupled to each other, the extension faces of the two light guiding devices collectively define a shielding space between the light exiting faces and the light outputting faces, and the frame is received in the shielding space;
    wherein the extension face and the light entering face of each of the light guiding devices collectively define an included angle facing the light exiting face of the light guiding device, the included angle being an obtuse angle.

12. The display device of claim 11, wherein the light exiting faces of the two light guiding devices have orthographic projections thereof on a plane where the exiting faces of the two screens are located entirely covering the light outputting faces of the two screens and the frame.

13. The display device of claim 11, wherein each of the light guiding devices further comprising a plurality of glass substrates and a plurality of transparent adhesive layers alternately arranged to each other.

14. The display device of claim 13, wherein the transparent adhesive layer has a refractive index no more than that of the glass substrate.

15. The display device of claim 14, wherein each of the light entering face and light exiting face of each of the light guiding device is defined by the plurality of glass substrates and the plurality of transparent adhesive layers.

16. A method for manufacturing a light guiding device, comprising:
    providing a plurality of glass substrates and a plurality of transparent adhesive layers;
    stacking the plurality of glass substrates and the plurality of transparent adhesive layers alternately into a stacked structure, the stacked structure comprising a top face, a bottom face opposite to the top face, a side face and an additional side face parallel to and opposite to the side face;
    defining a first precutting plane, a second precutting plane and a third precutting plane to the stacked structure, the first precutting plane extending from an intersecting line of the side face and the top face to an intersecting line of the additional side face and the bottom face, the second precutting plane intersecting the first precutting plane and the additional side face, the third precutting plane intersecting the first precutting plane and the side face, the second precutting plane paralleling to the third precutting plane; and
    cutting the stacked structure along the first precutting plane, the second precutting plane and the third precutting plane to obtain two of the light guide devices, each light guiding device obtaining a light entering face by cutting along the second precutting plane or the third precutting plane, a light exiting face by cutting along the first precutting plane, and a extension face connecting the light entering face and the light exiting face, the extension face and the light entering face collectively define an included angle that is an obtuse angle.

17. The method of claim 16, wherein the stacked structure has the glass substrates and the transparent adhesive layers overlapped to each other along a stacked direction of the stacked structure.

18. The method of claim 17, wherein the stacked structure has ends of the glass substrates flushed to each other.

19. The method of claim 16, wherein the stacked structure has ends of the glass substrates staggered to each other.

* * * * *